(12) United States Patent
Bruckner

(10) Patent No.: US 7,029,552 B1
(45) Date of Patent: Apr. 18, 2006

(54) METHOD OF MANUFACTURING SELF-ADHERING FOOTWEAR

(75) Inventor: Peter H. Bruckner, Panama City Beach, FL (US)

(73) Assignee: Thats Cool Inc., Yuma, AZ (US)

( * ) Notice: Subject to any disclaimer, the term of this patent is extended or adjusted under 35 U.S.C. 154(b) by 0 days.

(21) Appl. No.: 10/890,442

(22) Filed: Jul. 12, 2004

(51) Int. Cl.
*C09J 5/04* (2006.01)

(52) U.S. Cl. .................. 156/314; 156/60; 156/267; 156/281

(58) Field of Classification Search ............ 36/96, 36/104, 106; 156/60, 267, 281, 314
See application file for complete search history.

(56) References Cited

U.S. PATENT DOCUMENTS

| | | | |
|---|---|---|---|
| 5,983,527 A | 11/1999 | Strickland et al. ............ 36/12 |
| 6,526,676 B1 | 3/2003 | Ledergerber ............... 36/11.5 |
| 6,640,465 B1 | 11/2003 | Burgess ....................... 36/15 |
| 6,684,442 B1 | 2/2004 | Parker et al. ............... 12/146 B |
| 2003/0121181 A1* | 7/2003 | Chang ......................... 36/45 |
| 2004/0194342 A1* | 10/2004 | Steinberg .................. 36/11.5 |
| 2005/0011084 A1* | 1/2005 | Stephenson ................... 36/15 |

* cited by examiner

*Primary Examiner*—Gladys J. P. Corcoran
*Assistant Examiner*—Jayme L. Brown
(74) *Attorney, Agent, or Firm*—Richard K. Thomson

(57) ABSTRACT

A method of manufacturing self-adhering footwear including the steps of a) cleaning at least an upper surface portion of the mat with MEK solvent; b) applying a first adhesive to the cleaned surface; c) applying a second adhesive to the cleaned surface; d) applying and smoothing a fabric layer while the second adhesive is still wet; e) applying three light coats of the second adhesive to an upper surface of the fabric allowing adequate drying time between each successive coat.

10 Claims, No Drawings

METHOD OF MANUFACTURING SELF-ADHERING FOOTWEAR

BACKGROUND AND SUMMARY OF THE INVENTION

The present invention is directed to a method of manufacturing footwear. More particularly, the present invention is directed to a method of making footwear, sandals, etc., which adhere directly to the wearer's feet.

A number of attempts have been made to make a sandal which will stick to the bottom of the wearer's foot. The primary problem with these efforts has to do with the adhesive: the adhesive either does not stick at all or simply gives out after a very short period of time. The method of producing the self-adhering footwear which constitutes the present invention has met with a great deal of market acceptance since the adhesive is very effective at sticking to feet and may be reactivated by inserting the sandals in the microwave. The sandals made by this method are being marketed under the name DOWNUNDERS by THAT'S COOL, Inc.

The method for making a strapless sandal from a mat of foamed material comprises the steps of a) cleaning at least an upper surface portion of the mat with MEK solvent; b) applying a first adhesive to the cleaned surface; c) applying a second adhesive to the cleaned surface; d) applying and smoothing a fabric layer while the second adhesive is still wet; e) applying three light coats of the second adhesive to an upper surface of the fabric allowing adequate drying time between each successive coat. The method includes a step of applying a release paper over the adhesive layers. Once the release paper is in position, the strapless sandal is stamped from the mat, the sandals are bagged, a header card attached to the bag prior to sealing the bag, and the sandals boxed for shipping.

Preferably, the first adhesive comprises Wilsonart 400 and the second adhesive is an acrylate polymer dispersion. The foam material is comprised of expanded ethylene vinyl acetate (EVA). When the adhesive starts to lose its tackiness, it can be refreshed by cleaning the sandal, such as by scrubbing it with soap and water.

Various other features, advantages and characteristics of the present invention will become apparent to one of ordinary skill in the art after a reading of the following specification.

DETAILED DESCRIPTION OF PREFERRED EMBODIMENT(S)

The method of the present invention involves beginning with a large sheet or mat of expanded foam having a thickness in the range between ⅜" and ½". It is envisioned that other thicknesses of mat, both thicker and thinner, could be employed without departing from the scope of this invention. While other materials could be used, the preferred material is expanded ethylene vinyl acetate (EVA). The top surface is treated with a solvent known as MEK solvent. Once the surface dries, it is treated with a first adhesive. The preferred first adhesive is available from Wilsonart International Inc., Temple, Tex. 76503. The adhesive is alternatively identified as Wilsonart 400 Contact Adhesive and LOKWELD 400 adhesive. This adhesive has the following constituent parts: toluene 5–15% by weight; hexane isomers 15–40%; acetone 15–40%; methyl ethyl ketone 5–15%; V.M. & P naphtha 15–40%; N-hexane 1–5%.

Once the first adhesive has dried, the adhesive-coated surface of the mat is treated with a second adhesive. This second adhesive is purchased from Chem Tech Inc. in Bristol Ind. 46507 and is identified as D-220. Adhesive #2 is an aqueous acrylate polymer dispersion. Adhesive #2 is liberally applied to the surface in sufficient quantities to saturate a layer of fabric to be adhered thereto. The fabric layer is applied and smoothed while the second adhesive is still wet. While any fabric could be used, the preferred fabric is a cotton, most preferably with a decorative pattern to enhance the attractiveness to the purchaser's eye. Three additional light coats are separately applied to the fabric-coated surface of the mat, with adequate time between each application so the previous coat can dry. The entire process described thus far takes several days. Once this final coat of adhesive #2 has dried, a sheet of release paper is applied to the coated surface, the sandal pairs are stamped from the mat. A pair of sandals is placed in a bag with an appropriate header card being stapled to the bag. The bags are boxed (crated) for shipping.

The sandals made using this process, sold as DOWNUNDERS, are meeting with significant commercial acceptance, due largely to their ability to overcome the problems with similar self-adhering sandals previously made. These sandals readily conform to the foot of the wearer and adhere thereto. When the adhesive starts to lose its tackiness, it can be refreshed by cleaning the sandal, such as by scrubbing it with soap and water.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A method for making a strapless sandal from a mat of foam material comprising the steps of
   a) cleaning at least an upper surface portion of the mat with MEK solvent;
   b) applying a first adhesive to the cleaned surface;
   c) applying a second adhesive atop the first adhesive once it has dried;
   d) applying and smoothing a fabric layer while the second adhesive is still wet;
   e) applying multiple coats of the second adhesive to an upper surface of the fabric such that each successive coat is applied after the previous coat has dried to form an assembly; and (f) forming a strapless sandal with an uppermost adhesive layer from the assembly.

2. The method of claim 1 wherein said second adhesive comprises an acrylate polymer dispersion.

3. The method of claim 1 wherein said mat of foam is comprised of expanded ethylene vinyl acetate (EVA).

4. The method of claim 1 wherein said first adhesive comprises a contact adhesive.

5. The method of claim 4 wherein said second adhesive comprises an acrylate polymer dispersion.

6. The method of claim 1 further comprising the step of applying a release paper over the adhesive coated fabric.

7. The method of claim 6 further comprising the steps of stamping the strapless sandal from the mat.

8. The method of claim 7 further comprising bagging the sandals.

9. The method of claim 8 further comprising stapling a correct header card to the bag.

10. The method of claim 9 further comprising boxing the bagged sandals for shipment.

* * * * *